Nov. 20, 1923.

G. R. THOLE

FOOT REST

Filed May 19, 1922

1,474,950

Inventor:-
George R. Thole
by: Fred Gerlach
His Atty:-

Patented Nov. 20, 1923.

1,474,950

UNITED STATES PATENT OFFICE.

GEORGE R. THOLE, OF CHICAGO, ILLINOIS.

FOOT REST.

Application filed May 19, 1922. Serial No. 562,048.

*To all whom it may concern:*

Be it known that I, GEORGE R. THOLE, a citizen of the United States, and a resident of Chicago, in the county of Cook and State of Illinois, have invented certain new and useful Improvements in Foot Rests, of which the following is a full, clear, and exact description.

The invention relates to foot rests for automobile accelerators. Its object is to provide a simple foot-rest which is adapted to support one side of the ball of the foot leaving the other side free to engage the accelerator pedal and at the same time position the foot so that it will not slip from the pedal.

The invention consists in the several novel features hereinafter set forth and more particularly defined by claims at the conclusion hereof.

Figure 1:
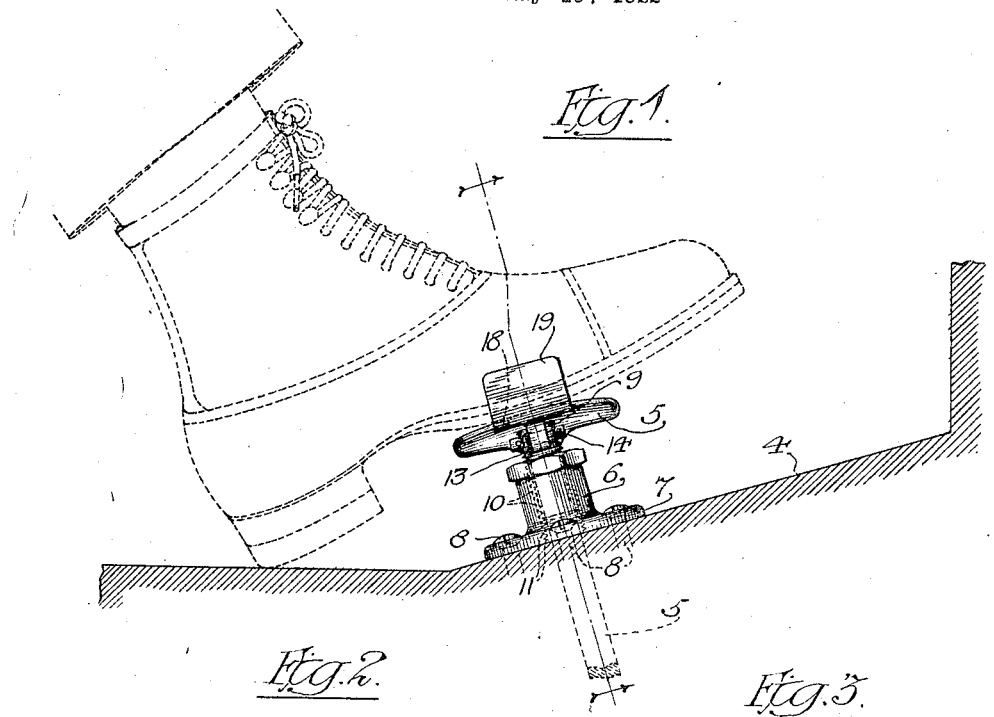
Figure 2:
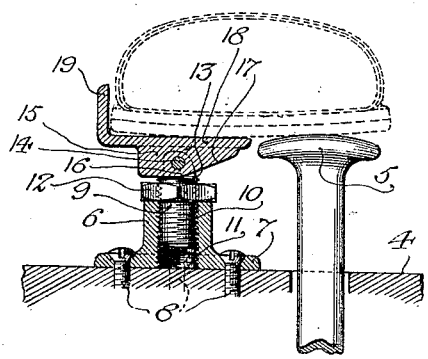
Figure 3:
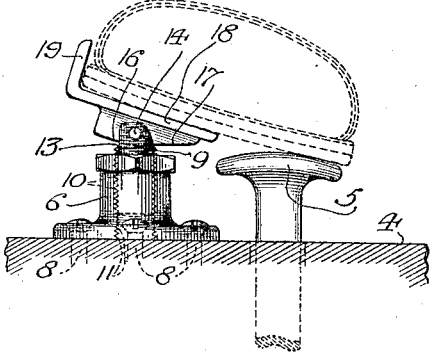

In the drawings: Fig. 1 is a side elevation of a foot-rest embodying the invention. Fig. 2 is a section on line 2—2 of Fig. 1. Fig. 3 is a similar view showing the pedal depressed.

The invention is exemplified in an automobile provided with the usual floor 4 and an accelerator pedal 5 which is vertically movable through the floor to operate the throttle in any suitable manner, as well understood in the art.

The improved foot rest is mounted at one side of the pedal 5 and comprises a socket 6 which has a base flange 7 secured to the floor 4 by screws 8. A post 9 is connected by a screw-thread 10 to a corresponding thread 11 in the socket, so that the post may be vertically adjusted by rotation in the socket. A lock-nut 12 on the stem is adapted to engage the upper end of the socket to secure the stem against rotation. The upper end of post 9 is bifurcated at 13 and the foot-rest is pivotally connected to said post by a pin 14 extending through a lug 15 projecting downwardly from the foot-rest. One portion 16 of this lug is formed to engage the bottom of the slot in the stem and limit the tilting of the foot-rest in one direction while the inclined portion 17 of said lug is formed to permit one side of the foot-rest to move downwardly. The foot-rest comprises a transversely extending support 18 adapted to fit under the ball of the foot and adjacent one side thereof, so that there will be sufficient foot-room at one side of the foot-rest for engagement with the top of the pedal 5. A stop flange 19 is provided at the side of the foot rest which is remote from the pedal to confine the foot against sidewise movement in one direction to retain it on the rest, so that the foot will not slip off the pedal while the foot is being transversely rocked in controlling the pedal.

The invention exemplifies a rest which is adapted to be placed laterally of an accelerator pedal to support one side of the ball of the foot, while the other side is free to operate the pedal; in which provision is made for holding the foot against lateral movement in one direction in which vertical adjustment may be effected by the screw-threaded connection between the socket and the post to which the foot rest is pivoted and in which it is not necessary to drill a hole through the floor in applying the socket.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a foot-rest for use with an accelerator pedal, the combination of a transverse support to fit under one side of the ball of the foot of an operator and terminating adjacent the transverse center of the foot to leave the other side of the foot free to directly engage a pedal transversely adjacent to the other side of the support, a fixed stop on said support for the side of the foot remote from the pedal, and means to pivotally sustain said support medially and to swing transversely so that it will rock responsively to the transverse rocking of the foot in shifting the pedal, the support being free to swing transversely independently of the pedal.

2. In a foot-rest for use with an accelerator, the combination of a socket provided with a flange and means whereby it may be secured to the floor and having an internal screw-thread, a post provided with a screw-thread fitting the thread in the socket, a foot-rest pivoted to the upper end of the post, and a lock-nut threaded to the post for securing it against rotation.

Signed at Chicago, Illinois, this 20th day of March, 1922.

GEORGE R. THOLE.